(12) United States Patent
Lohmüller et al.

(10) Patent No.: US 7,914,024 B2
(45) Date of Patent: Mar. 29, 2011

(54) WHEEL SUSPENSION FOR A VEHICLE

(75) Inventors: Holger Lohmüller, Vehrte (DE); Felix Haeusler, Osnabrück (DE); Michael Klank, Osnabrück (DE); Joachim Spratte, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 486 days.

(21) Appl. No.: 11/917,550

(22) PCT Filed: Jun. 16, 2006

(86) PCT No.: PCT/DE2006/001037
§ 371 (c)(1),
(2), (4) Date: Dec. 14, 2007

(87) PCT Pub. No.: WO2006/133694
PCT Pub. Date: Dec. 21, 2006

(65) Prior Publication Data
US 2009/0051135 A1 Feb. 26, 2009

(30) Foreign Application Priority Data
Jun. 17, 2005 (DE) .................. 10 2005 028 501

(51) Int. Cl.
*B60G 7/00* (2006.01)
*G01B 7/14* (2006.01)

(52) U.S. Cl. ......... 280/124.1; 280/124.134; 324/207.22; 403/122

(58) Field of Classification Search ............... 280/124.1, 280/124.134, 124.135, 124.136, 124.145, 280/124.146, 124.147; 324/207.22, 207.25, 324/261; 73/514.16, 514.31, 514.39; 403/122, 134, 135
See application file for complete search history.

(56) References Cited

U.S. PATENT DOCUMENTS 4,796,720 A * 1/1989 Bauer .................... 180/234
(Continued)

FOREIGN PATENT DOCUMENTS

DE 10110738 C1 11/2002
(Continued)

*Primary Examiner* — Paul N. Dickson
*Assistant Examiner* — George D. Spisich
(74) *Attorney, Agent, or Firm* — McGlew and Tuttle, P.C.

(57) ABSTRACT

Wheel suspension for a vehicle (7), with a carrier element (5), with a wheel carrier (1), which is arranged at a spaced location from the carrier element (5) and which is pivotable about a steering axis (30), with a wheel (14) mounted rotatably on the wheel carrier (1), with a steering wheel (58), which is mounted rotatably on the carrier element (5) at least indirectly and by means of which the wheel carrier (1) is pivotable about the steering axis (30), with at least one joint (8), which is connected to the wheel carrier (1) and which has a housing (26), a pivot pin (25) mounted pivotably in same and an angle-measuring device with a magnet (27) and with a magnetic field-sensitive sensor assembly unit (28), and with at least one guide means (2), via which the joint (8) is connected to the carrier element (5). A deflection (ω) of the pivot pin (25) relative to the housing (26) can be determined by means of the angle-measuring device in at least two different directions in space, and the magnetization (M) of the magnet (27) is oriented such that it extends at right angles to the steering axis (30).

20 Claims, 13 Drawing Sheets

U.S. PATENT DOCUMENTS

| | | | | |
|---|---|---|---|---|
| 5,246,245 A | * | 9/1993 | Sato et al. | 280/124.138 |
| 5,257,458 A | * | 11/1993 | Koerner | 33/203.12 |
| 5,712,478 A | * | 1/1998 | Olsson | 250/231.13 |
| 6,501,458 B2 | * | 12/2002 | Baker et al. | 345/161 |
| 6,879,240 B2 | * | 4/2005 | Kruse | 338/12 |
| 7,063,480 B2 | * | 6/2006 | Ersoy et al. | 403/132 |
| 7,170,285 B2 | * | 1/2007 | Spratte | 324/207.25 |
| 7,261,487 B2 | * | 8/2007 | Urbach | 403/114 |
| 7,367,742 B2 | * | 5/2008 | Brunneke et al. | 403/122 |
| 7,405,557 B2 | * | 7/2008 | Spratte et al. | 324/207.22 |
| 7,695,212 B2 | * | 4/2010 | Spratte et al. | 403/135 |
| 2006/0228167 A1 | * | 10/2006 | Spratte et al. | 403/122 |
| 2007/0059091 A1 | * | 3/2007 | Spratte et al. | 403/27 |

FOREIGN PATENT DOCUMENTS

| | | | |
|---|---|---|---|
| DE | 101 34 259 A1 | | 2/2003 |
| DE | 102004053690 | | 5/2006 |
| EP | 0 617 260 | * | 9/1994 |
| WO | WO2005/021295 A1 | | 3/2005 |
| WO | WO2006/056170 A1 | | 6/2006 |

* cited by examiner

WHEEL SUSPENSION FOR A VEHICLE

CROSS REFERENCE TO RELATED APPLICATIONS

This application is a United States National Phase application of International Application PCT/DE 2006/001037 and claims the benefit of priority under 35 U.S.C. §119 of DE 10 2005 028 501.5 filed Jun. 17, 2005, the entire contents of which are incorporated herein by reference.

FIELD OF THE INVENTION

The present invention pertains to a wheel suspension for a vehicle, with a carrier element, with a wheel carrier, which is arranged at a spaced location from the carrier element and is pivotable about a steering axle, with a wheel mounted rotatably at the wheel carrier, with a steering wheel, which is mounted rotatably at the carrier element at least indirectly and by means of which the wheel carrier is pivotable about the steering axle, with at least one joint, which is connected to the wheel carrier and which has a housing, a pivot pin mounted pivotably in same and an angle-measuring device with a magnet and with a magnetic field-sensitive sensor assembly unit, and with at least one guide means, via which the joint is connected to the carrier element. The present invention pertains, furthermore, to a vehicle with such a wheel suspension, to a process for determining a steering angle, as well as to the use of the wheel suspension to carry out the process.

BACKGROUND OF THE INVENTION

Wheel suspensions in which an angle-measuring device is used to measure the spring compression of the vehicle are known from the state of the art. The steering angle may represent a disturbance variable depending on the type of the axle. Attempts to determine the steering angle have failed so far because the angle-measuring device did not provide unambiguous information for determining the steering angle.

A motor vehicle, in which measurement of an elastokinematic angle is additionally carried out to determine an absolute steering angle, is described in DE 10 2004 053 690.2. A front wheel steering of the vehicle has a steering wheel, a steering angle sensor and a power steering, wherein this angle measurement is carried out at a ball and socket joint, which represents the head-side angle joint of a track rod. The angle joint has a ball pivot with a joint ball, with a pivot and with a magnetic field transducer. A magnetic field detector is in magnetic functional connection therewith, and angular motions about the longitudinal axis of a ball pivot can be detected. However, only the approximate position of the wheel being steered can be determined by this measurement.

SUMMARY OF THE INVENTION

The object of the present invention is to perfect the wheel suspension of the type described in the introduction such that the steering angle can be determined at a high accuracy and in the relevant steering angle range from the deflections detected by the angle-measuring device.

The wheel suspension according to the present invention for a vehicle, especially a motor vehicle, has a carrier element, a wheel carrier, which is arranged at a spaced location from the carrier element and which is pivotable about a steering axle, a wheel mounted rotatably on the wheel carrier, and a steering wheel, which is indirectly or directly mounted rotatably on the carrier element and by means of which the wheel carrier is pivotable about the steering axle, at least one joint, which is connected to the wheel carrier and which comprises a housing, a pivot pin mounted pivotably in same and an angle-measuring device with a magnet and with a magnetic field-sensitive sensor assembly unit, and at least one guide means, via which the joint is connected to the carrier element. Deflection of the pivot pin in relation to the housing can be detected by means of the angle-measuring device in at least two different directions in space, the magnetization of the magnet being oriented such that it extends obliquely to the steering axle.

If the steering wheel is turned, the wheel pivots about the steering axle, and the joint is pivoted or rotated as well. This results in a change in the position of the magnet relative to the sensor assembly unit, which can be detected by the angle-measuring device. The oblique orientation of the magnetization of the magnet surprisingly leads to an accurate and unambiguous relationship between the steering angle and the deflection detected by the angle-measuring device in the relevant steering angle range, the steering angle preferably characterizing the rotation, especially the relative rotation of the steering wheel in relation to the carrier element. However, the steering angle may also represent the pivoting of the wheel carrier or of the wheel about the steering axle.

The term "magnetization" is defined preferably as the resulting magnetization of the magnet. Furthermore, the term "oblique" means that the angle between the magnetization and the steering axle is preferably greater than 0° and smaller than 90°. In particular, this angle is, however, always greater than or equal to 5°, or this angle is between 5° and 15° and preferably about 10°, because an especially marked relationship, which is especially unambiguous, has been obtained for this angle range or angle.

The deflection is detected in at least two different directions in space. This can be achieved, for example, by the deflection being measured by the angle-measuring device in the form of at least two angles, which the pivot pin assumes or has relative to the housing, the two angles being in different and intersecting planes or detection planes. The deflection is thus divided into at least two components. Furthermore, the measurement of the two angles is especially simultaneous.

The pivot pin has a longitudinal axis and is preferably a rotationally symmetrical body, whose axis of rotation coincides with the longitudinal axis of the pivot pin. Furthermore, the housing has a longitudinal axis, which coincides with the longitudinal axis of the pivot pin, especially in the undeflected state. An essentially rotationally symmetrical recess, in which the pivot pin is mounted pivotably, may be provided in the housing, the axis of rotation of the recess coinciding, in particular, with the longitudinal axis of the housing.

The joint is preferably a ball and socket joint, so that the pivot pin forms a ball pivot. However, it is also possible to use another joint, in which case the pivot pin is pivotable in at least two different directions in space in relation to the housing.

The term "steering axle" designates especially an axis of rotation, which is rigidly connected to the wheel and about which the wheel or the wheel carrier pivots during steering motions. The position of the steering axle relative to the vehicle body or the road surface can be described by the characteristics such as caster angle, the inclination of the steering knuckle pivot and the roll radius, which is known from the state of the art. In modern double wishbone and spring strut or shock absorber strut front axles (McPherson axle), the steering axle extends through the ball joints, which connect the wheel carrier to the suspension arms or through the upper, body-side pivot bearing of the spring strut or shock absorber strut. In the case of a four-arm front axle, the line connecting the instantaneous centers of rotation of the upper and lower double joints forms an instantaneous rotation axis during steering, which represents a virtual steering axle.

The joint can be fastened such that its longitudinal axis extends in parallel or at right angles to the steering axle or it may be fastened coinciding with same to the wheel carrier. However, the joint is preferably fastened to the wheel carrier such that its longitudinal axis extends obliquely to the steering axle. The term "oblique" means in this connection that the angle between the longitudinal axis of the joint and the steering axle is preferably greater than 0° and smaller than 90°. However, the angle is, in particular, between 5° and 15° and preferably about 10°.

According to a first alternative, the housing may be fastened to the wheel carrier, whereas the pivot pin is fixed to the guide means. The longitudinal axis of the housing preferably forms the longitudinal axis of the joint in this arrangement.

According to a second alternative, the pivot pin is fastened to the wheel carrier, whereas the housing is fixed to the guide means, the longitudinal axis of the pivot pin preferably forming the longitudinal axis of the joint.

The magnetization of the magnet may extend in parallel to the longitudinal axis or coincide with same. The magnetization preferably extends in parallel to the longitudinal axis of the pivot pin or coincides with same. As an alternative, the magnetization may, however, also be oriented obliquely to the longitudinal axis of the pivot pin or of the joint.

A steering gear, in particular, which is indirectly or directly fastened to the carrier element and is connected to the wheel carrier via a track rod, is actuated by the steering wheel. Such steering gears are known from the state of the art and have, for example, a toothed rack, which is connected to the track rod and which is displaceable via a toothed gear, bevel gear or the like, which meshes with the toothed rack and is connected to the steering wheel at least indirectly to pivot the wheel carrier. The steering wheel may be electrically connected to the steering gear via a control device, but the steering wheel is preferably coupled with or connected to the steering gear mechanically via a steering shaft, which forms especially a connection between the steering wheel and the toothed gear, bevel gear or the like.

The guide means maybe formed, for example, by a track rod, but the guide means is preferably a control arm or a suspension arm, especially an upper suspension arm or a lower suspension arm. Furthermore, the wheel carrier is preferably connected to the carrier element indirectly or directly via a spring and/or a shock absorber.

The angle-measuring device designed as a magnetic measuring device is preferably integrated within the joint, the magnet being seated, for example, in the pivot pin and the sensor assembly unit, for example, in the housing. However, a reversed arrangement is possible as well. If the magnet is arranged in the pivot pin and the housing is fastened to the wheel carrier, the magnet can pivot together with the pivot pin relative to the wheel carrier and thus also relative to the steering axle. It shall preferably be ensured in this case that the magnetization of the magnet in the construction position is oriented obliquely to the steering axle. In particular, it shall be ensured that the direction of magnetization always forms an angle greater than 0°, especially greater than or equal to 5° and smaller than 90°, especially smaller than or equal to 15° with the steering axle in different spring compression positions.

The sensor assembly unit may have only one magnetic field-sensitive sensor. However, the sensor assembly unit preferably comprises at least two magnetic field-sensitive sensors, which are designed, for example, as magnetoresistive sensors and may be seated in or at the housing. The angle-measuring device is designed now such that at least two angles between the steering axle of the pivot pin and the longitudinal axis of the housing can be determined by it, the two angles being located in different and intersecting planes. This can be achieved by one of the sensors each being arranged in parallel to or in each of these planes. In particular, the sensors have a detection plane each, which coincides with the particular plane or extends in parallel to this. Furthermore, the intersection lines of the two planes may extend obliquely to the steering axle and/or coincide with the longitudinal axis of the housing or of the joint or extend in parallel to that longitudinal axis. Oblique orientation of the intersection line in relation to the longitudinal axis of the housing or of the joint is possible as well. The two planes or detection planes form especially right angles with one another.

The present invention pertains, furthermore, to a vehicle with a vehicle body and at least one wheel suspension according to the present invention, wherein the carrier element is part of the vehicle body, is connected to same or is formed by same. The wheel suspension may be perfected according to all the embodiments mentioned before. The vehicle preferably has at least one second wheel carrier with a second wheel mounted rotatably thereon, which wheel carrier is arranged at a spaced location from the vehicle body and is connected to same, wherein the two wheels are part of a vehicle axle, especially of a steerable vehicle axle.

The present invention also pertains to a process for determining a steering angle of a wheel and/or of a steering wheel mounted rotatably on a vehicle body of a vehicle, by which steering wheel the wheel is pivotable or is pivoted indirectly or directly with the vehicle body, and which is indirectly or directly connected to the vehicle body via a joint, wherein the joint has an angle-measuring device with a magnet and with a magnetic field-sensitive sensor assembly unit, and wherein:

the joint is mounted in the vehicle in such an oriented manner that the magnetization of the magnet is always oriented obliquely to the steering axle, a performance graph is recorded, the deflection of the joint is measured or detected in at least two different directions in space, and the steering angle is determined in the performance graph or by means of the performance graph on the basis of the measured deflection.

The wheel is pivoted by turning the steering wheel, so that the joint is also rotated or pivoted. This pivoting or rotation of the joint is detected in the process or thereafter by means of the angle-measuring device.

The wheel is especially spring-mounted on the vehicle body. Furthermore, it is possible to determine the spring compression position of the wheel relative to the vehicle body in the performance graph on the basis of the measured deflection. The spring compression position represents here especially the distance between the center of the wheel and the vehicle body.

The deflection is detected in at least two different directions in space, preferably in the form of two angles, which are located in mutually intersecting planes in space. If the joint has a housing and a pivot pin mounted pivotably in same, the deflection is determined or measured as a pivoting of the pivot pin in relation to the housing.

The performance graph may be recorded in different manners. According to a first alternative, different spring compression positions of the wheel relative to the vehicle body are set in a step 1 at a constant steering angle, the deflection of the joint being determined in at least two different directions in space for each spring compression position. Step 1 is then repeated with another steering angle in step 2.

According to a second alternative, the performance graph is recorded as follows. Different steering angles are set in a step 1 at a constant spring compression position of the wheel in relation to the vehicle body, the deflection of the joint being determined in at least two different directions in space for each steering angle. Step 1 is then repeated with another spring compression position in step 2.

The present invention pertains, furthermore, to the use of a wheel suspension according to the present invention or of a motor vehicle according to the present invention for carrying out the aforementioned process, wherein the wheel suspension can be perfected according to all the embodiments mentioned above.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
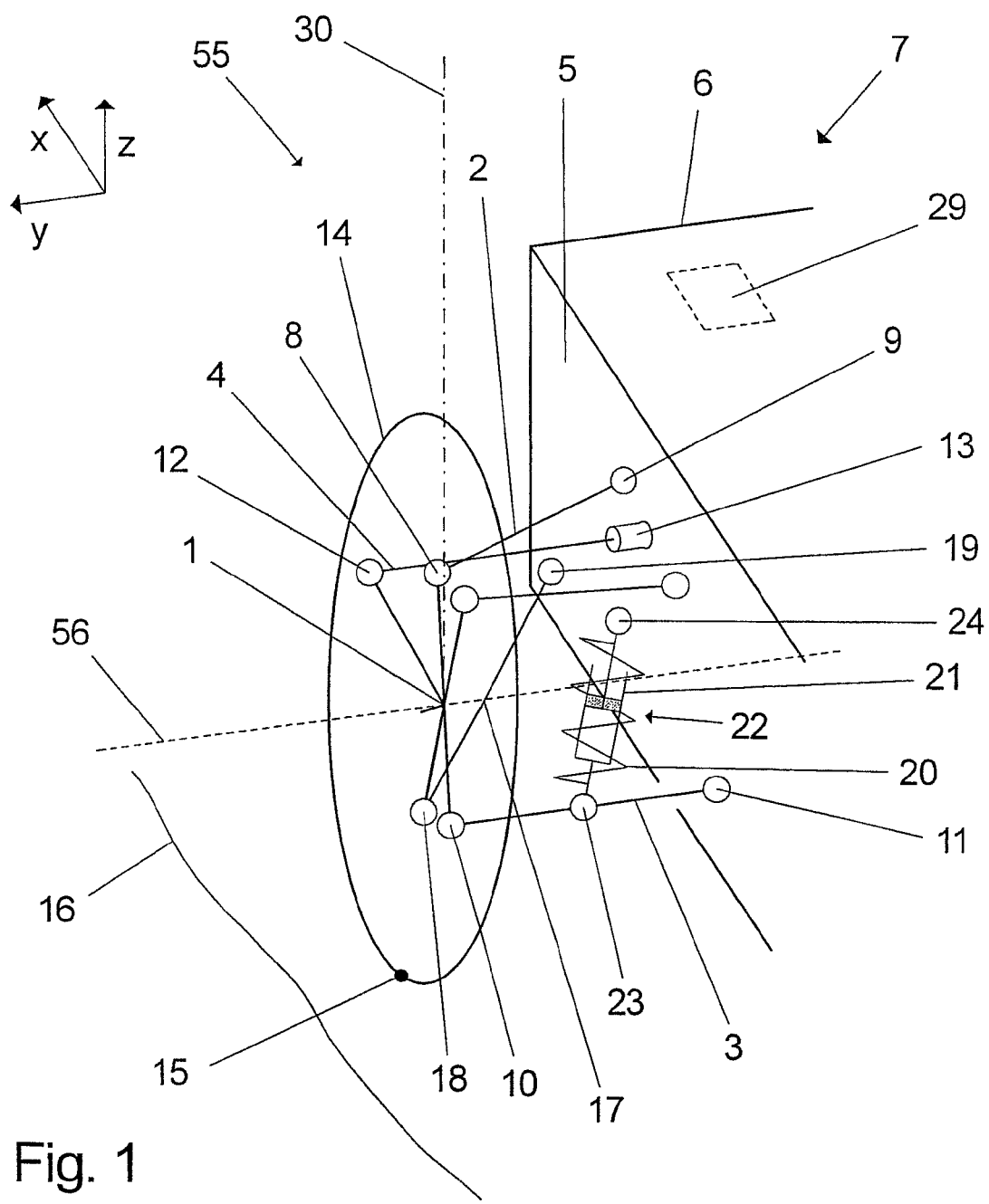
FIG. 1 is a schematic view of a wheel suspension according to the present invention according to a first embodiment.

Referring to the drawings in particular, FIG. 1 shows a schematic view of a first embodiment of the wheel suspension 55 according to the present invention, wherein a wheel carrier 1 is connected via an upper suspension arm 2, a lower suspension arm 3 and a track rod 4 to a carrier element 5, which is part of a vehicle body 6 of a vehicle 7 shown partially. The upper suspension arm 2 is connected to the wheel carrier 1 via a ball and socket joint 8 and to the carrier element 5 via an elastomer bearing 9. The lower suspension arm 3 is connected to the wheel carrier 1 via a ball and socket joint 10 and to the carrier element 5 via an elastomer bearing 11. Furthermore, the track rod 4 is connected to the wheel carrier 1 via a ball and socket joint 12 and to the carrier element 5 via a steering gear 13 shown schematically, the track rod 4 being displaceable in its longitudinal direction by means of the steering gear 13. Such a displacement of the track rod 4 brings about a pivoting of the wheel carrier 1 about a steering axis 30.

A tire or a wheel 14, which is in contact with a road surface 16 shown schematically in a wheel contact point, is mounted rotatably on the wheel carrier 1. Furthermore, the wheel carrier 1 is connected to the carrier element 5 via a radius arm 17, which is articulated or connected to the wheel carrier 1 via a ball and socket joint 18 and to the carrier element 5 via an elastomer bearing 19. The wheel suspension 55 is part of a steerable front axle 56, which is shown schematically and is designed as a four-arm front axle here.

The lower suspension arm, 3 is additionally connected to the carrier element 5 via a spring 20 and a shock absorber 21, the spring 20 and the shock absorber 21 together forming a spring type shock absorber unit 22, which is fastened to the lower suspension arm 3 via a joint 23 and to the carrier element 5 via a joint 24. However, it is possible, in principle, to arrange the force elements spring and/or shock absorber between the carrier element 5 and the wheel carrier 1 anywhere in the wheel suspension and separately or in a coupled form. Furthermore, the directions in space x, y and z are indicated in a system of coordinates.

Figure 2:
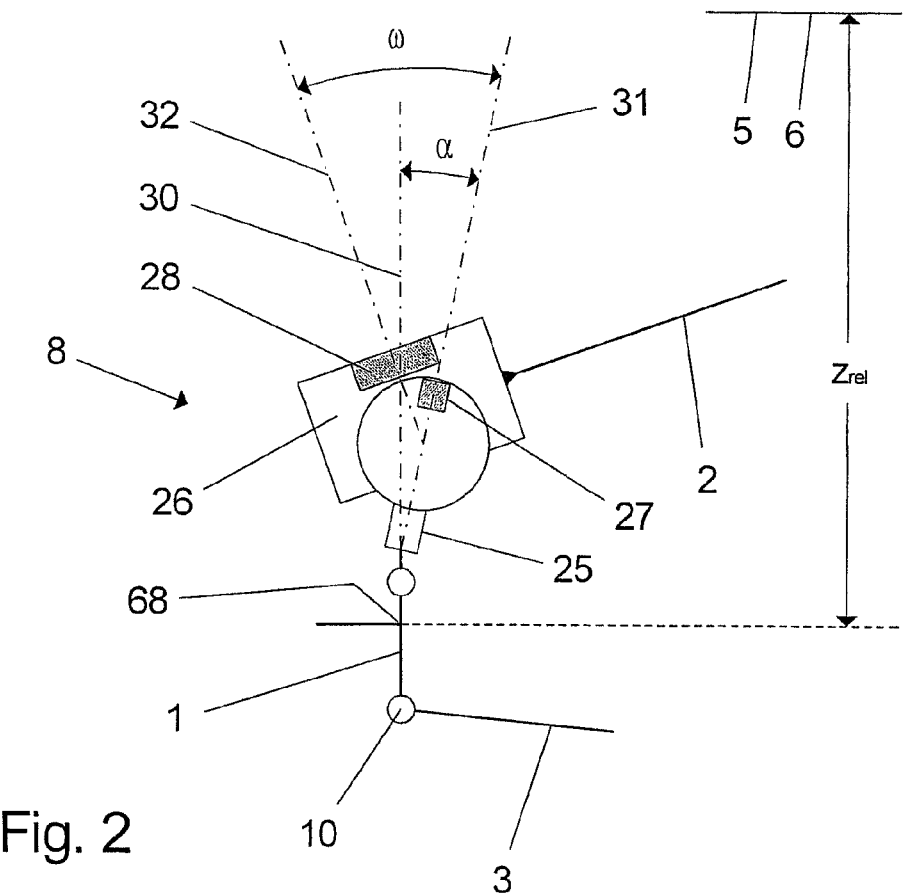
FIG. 2 is a schematic view of an upper suspension arm according to FIG. 1 with a ball and socket joint with integrated angle-measuring device according to a first alternative.

FIG. 2 shows a schematic view of the ball and socket joint 8, which has a ball pivot 25 and a ball and socket joint housing 26, in which the ball pivot 25 is mounted rotatably and pivotably. A permanent magnet 27 is arranged in the ball pivot 25, whereas a magnetic field-sensitive sensor assembly unit 28 is provided in the ball and socket joint housing 26. The magnet 27 and the magnetic field-sensitive sensor assembly unit 28 together form an angle-measuring device, which is integrated within the ball and socket joint 8. The ball and socket joint housing 26 is rigidly connected to the upper suspension arm 2, and the ball pivot 25 is rigidly connected to the wheel carrier 1, the steering axle 31 of the ball pivot 25 forming an angle $\alpha$ greater than 5° and especially 10° with the steering axis 30. The pivoting $\omega$ between the longitudinal axis 31 of the ball pivot 25 and the longitudinal axis 32 of the housing 26 can be detected by means of the angle-measuring device in the form of two angles, which are located in two different and intersecting planes 33, 34 (see FIG. 5). The direction of magnetization M (see FIG. 4) of the magnet 27 now coincides with the longitudinal axis 31 of the ball pivot 25, so that the angle $\alpha$ also represents the angle between the direction of magnetization and the steering axis 30.

Furthermore, FIG. 2 shows the spring compression position $z_{rel}$ of the wheel 14 or of the wheel carrier 1 in relation to the vehicle body 6 or the carrier element 5. The spring compression or spring compression position $z_{rel}$ characterizes here the distance between the center 68 of the wheel 14 and the vehicle body 6, preferably in direction "z" in space.

Figure 3:
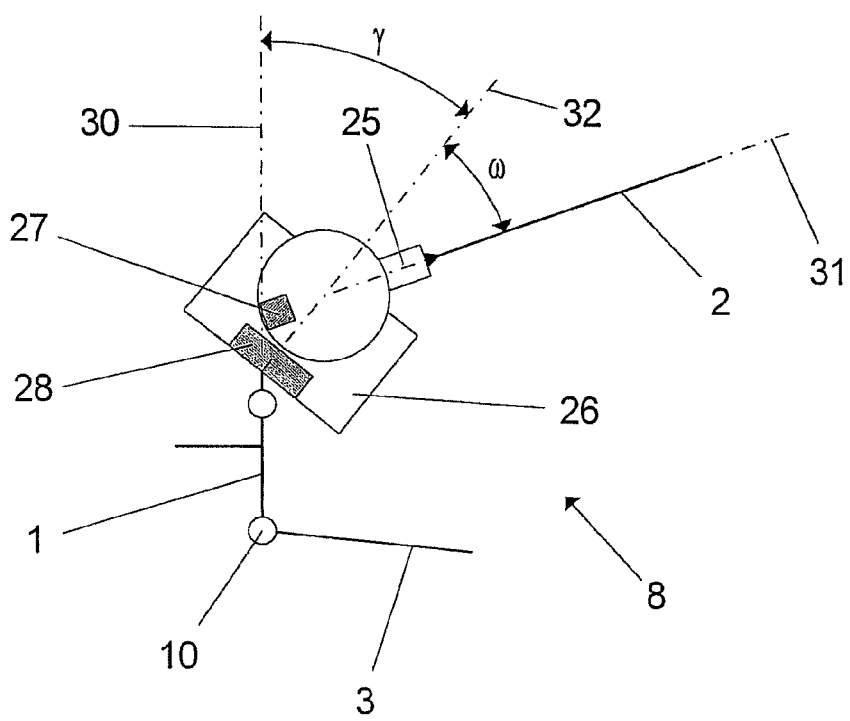
FIG. 3 is a schematic view of an upper suspension arm according to FIG. 1 with a ball and socket joint with integrated angle-measuring device according to a second alternative.

FIG. 3 shows an alternative arrangement of the ball and socket joint 8, in which the housing 26 is fastened to the wheel carrier 1 and the ball pivot 25 is rigidly connected to the upper suspension arm 2. The longitudinal axis 32 of the ball and socket joint housing 26 forms an angle γ of greater than 5° and especially 10° with the steering axis 30. Aside from the reversed arrangement of the ball pivot 25 and the housing 26, the design of the ball and socket joint according to FIG. 3 is the same as the design of the ball and socket joint shown in FIG. 2. Furthermore, the direction of magnetization M of the magnet 27 coincides with the longitudinal axis 31 of the ball pivot 25 in this case as well.

Figure 4:
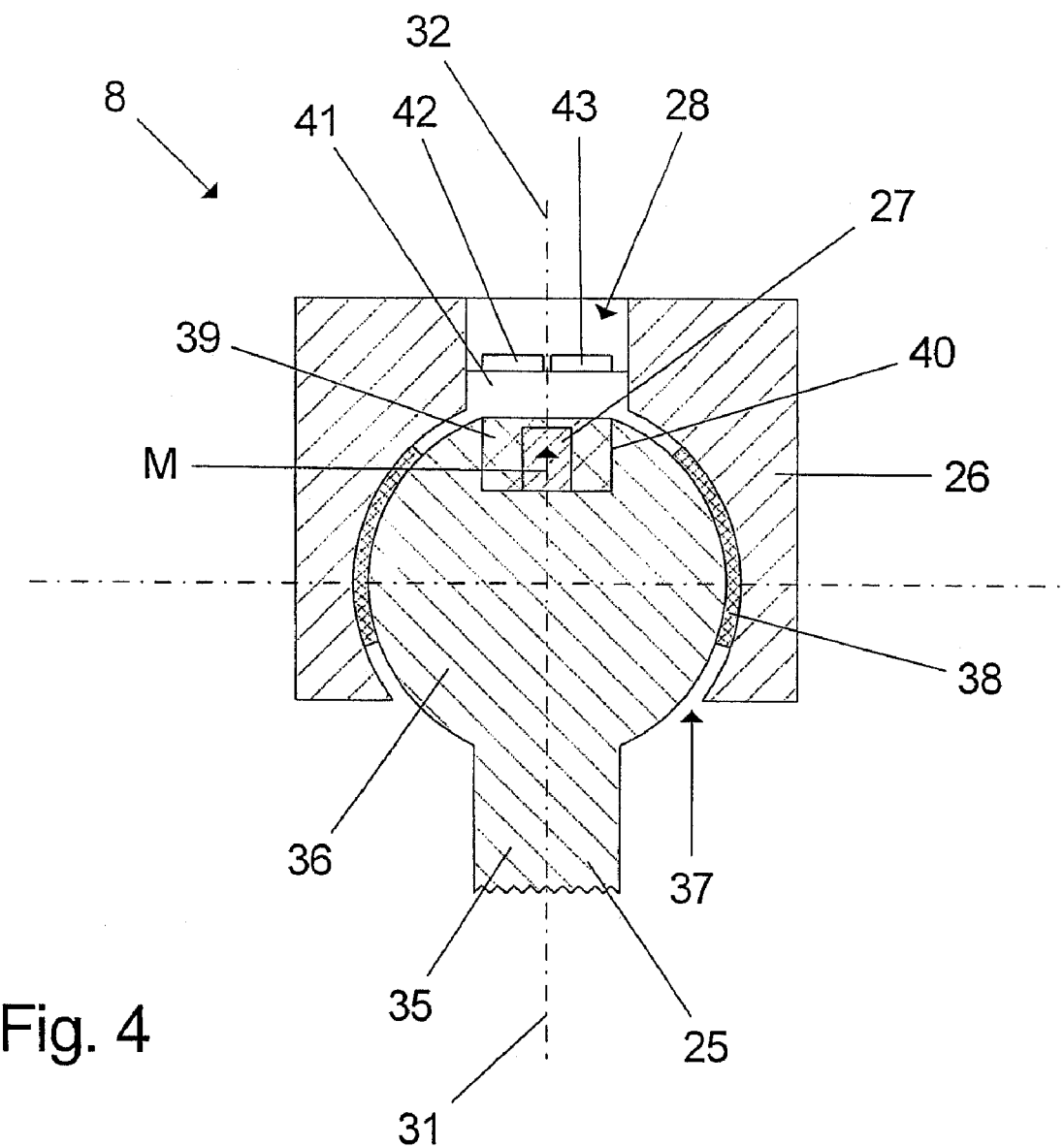
FIG. 4 is a sectional view through the ball and socket joint according to FIG. 2 or FIG. 3.

FIG. 4 shows a schematic sectional view through the ball and socket joint 8, in which the ball pivot 25 has a pin 35 as well as a joint ball 36 connected to same and protrudes from the housing 26 through an opening 37 provided in the housing 26. Furthermore, the ball pivot 25 is mounted in the housing 26 through the intermediary of a ball shell 38.

The magnet 27 is a permanent magnet, whose magnetization is designated by M, the magnet 27 being embedded in a non-magnetic material 39 and being seated in a recess 40 provided in the joint ball 36. Furthermore, the sensor assembly unit 28 is arranged in a recess 41 provided in the housing 26.

Figure 5:
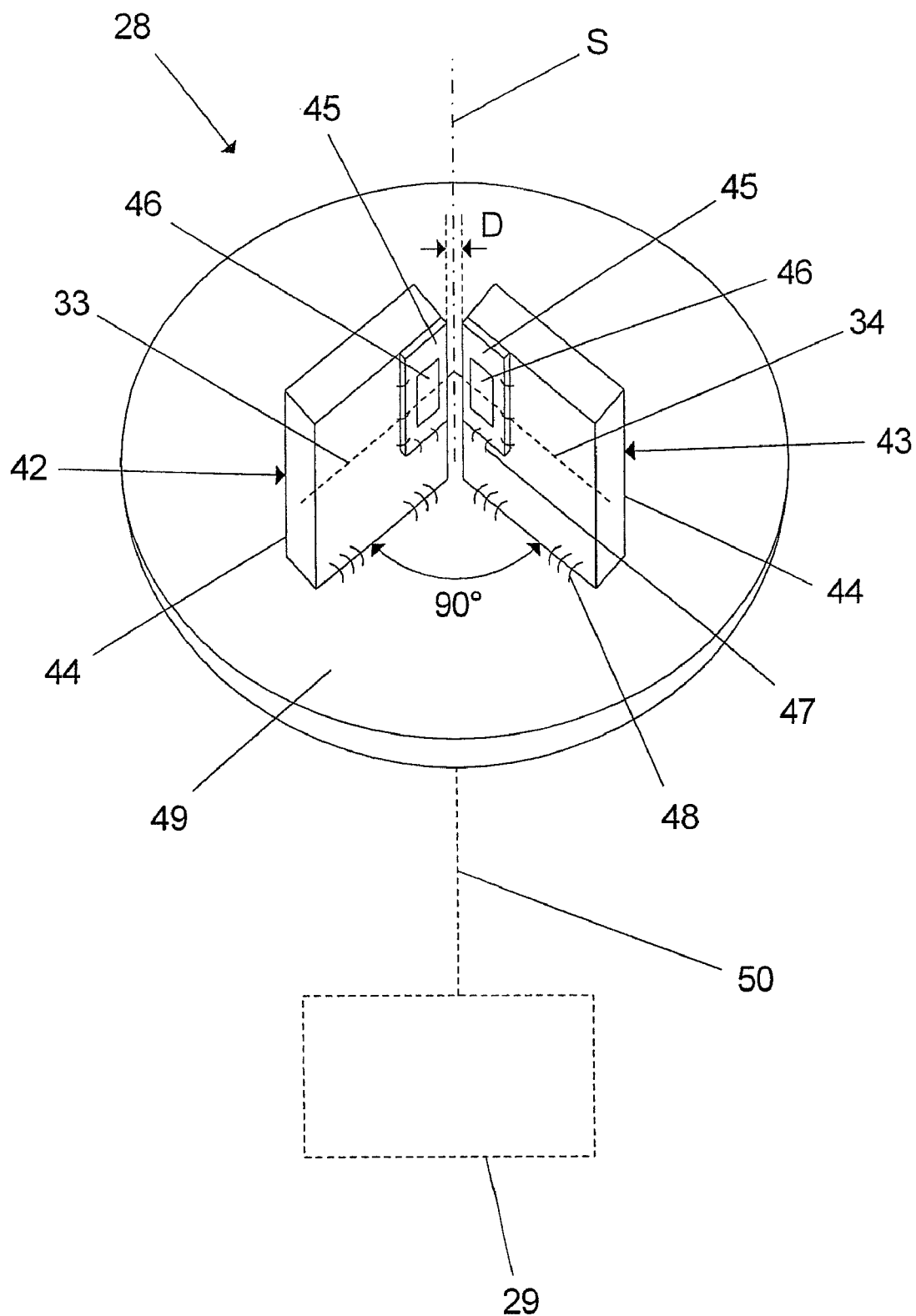
FIG. 5 is a schematic view of the sensor assembly unit according to FIG. 4.

FIG. 5 shows a schematic view of the sensor assembly unit 28, in which two sensors 42 and 43 have a sensor carrier 44 and a sensor element 45 with a sensitive surface 46 each. The two sensor carriers 44 and sensor elements 45 are arranged at spaced locations D from one another and form an angle of 90° with one another. However, it is also possible to reduce the distance D to zero. Furthermore, the sensitive surfaces 46 of the sensor elements 45 form right angles with one another, or, in other words, the two sensitive surfaces 46 are located in planes or detection planes 33 and 34 that form right angles with one another. The intersection lines of the two detection planes 33 and 34, which line is designated by S, coincides here with the longitudinal axis 32 of the housing 26 or is oriented in parallel to same. It is possible by means of the sensor assembly unit 28 to resolve the pivoting ω between the ball pivot 25 and the housing 26 into two angles oriented at right angles to one another and to measure these, so that the position in space of the ball pivot 25 relative to the housing 26 can be determined with a high accuracy.

The sensor elements 45 are connected via electric contacts 47 to the particular sensor carrier 44, which is electrically connected via electric contacts 48 to a printed circuit board 49, on which the two sensor carriers 44 are seated. Furthermore, electric lines 50 are connected to the printed circuit board 49, and the lines extend to an analysis device 29, which may likewise be integrated in the sensor assembly unit 28, but is preferably arranged in the vehicle body 6 (see FIG. 1).

Figure 6:
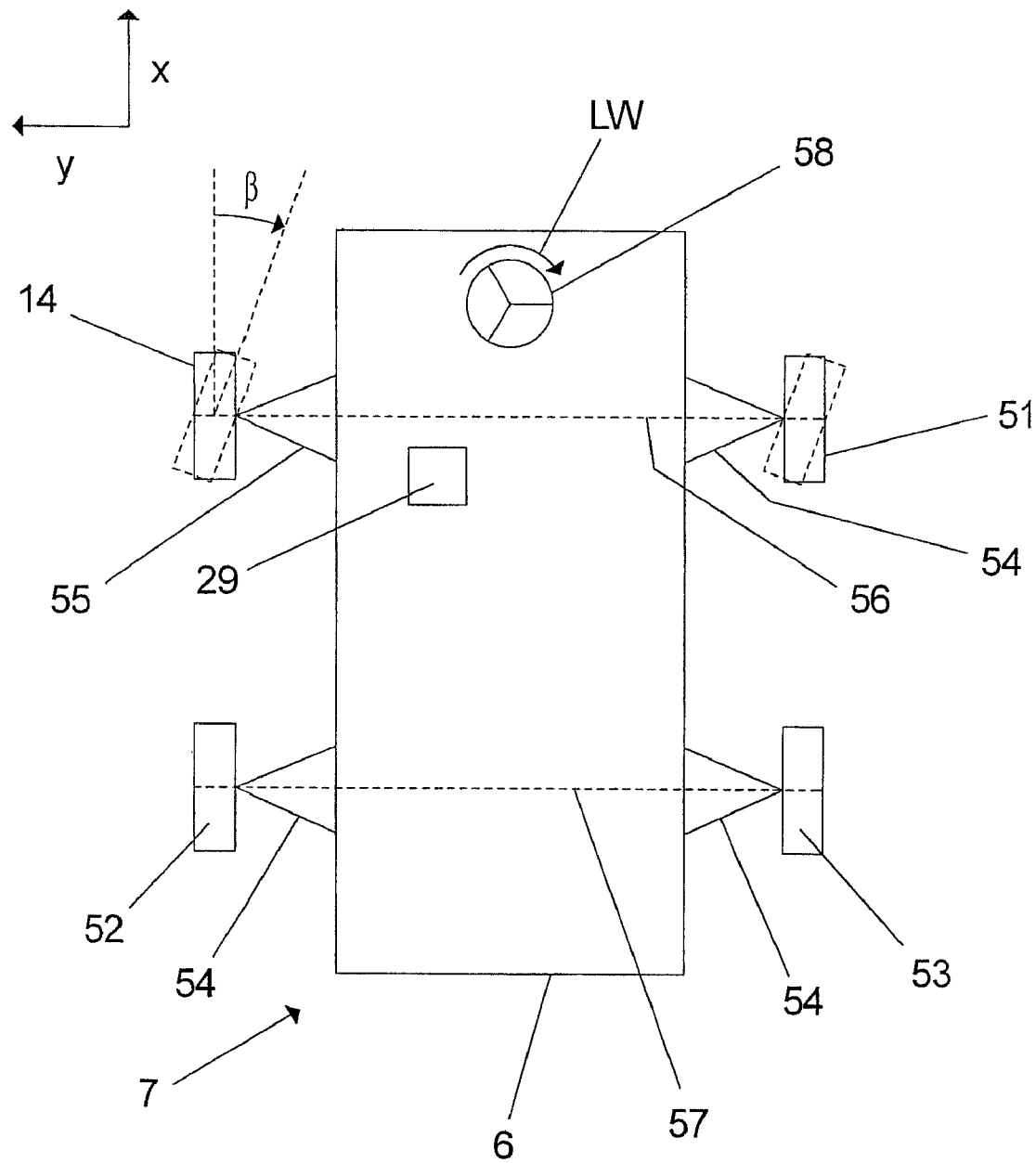
FIG. 6 is a schematic top view of a motor vehicle with the wheel suspension according to FIG. 1.

FIG. 6 shows a simplified top view of the motor vehicle 7, which has, in addition to the wheel 14, three more wheels 51, 52 and 53, which are connected each to the vehicle body 6 via wheel suspensions 54 shown schematically. The wheel 14 is connected to the vehicle body 6 via the wheel suspension 55 according to the present invention, which is shown in FIG. 1, and wheel suspensions according to the present invention may also be formed by the wheel suspensions 54. However, the wheel suspension 54 of wheel 51 is designed, in particular, as wheel suspensions according to the present invention.

The two wheels 14 and 51 are part of the steerable front axle 56 of the vehicle 7, whereas the wheels 52 and 53 are part of a rear axle 57 of the vehicle 7. A steering wheel 58 mounted rotatably on the vehicle body 6 is mechanically coupled with the steering gear 13, so that pivoting of the wheel 14 and 51 by an angle β can be achieved or is achieved by rotating the steering wheel 58 by a steering angle LW. Based on the two angles measured by the angle-measuring device and the sensor assembly unit 28, unambiguous determination of the steering angle LW and of the angle β is possible.

Figure 7:
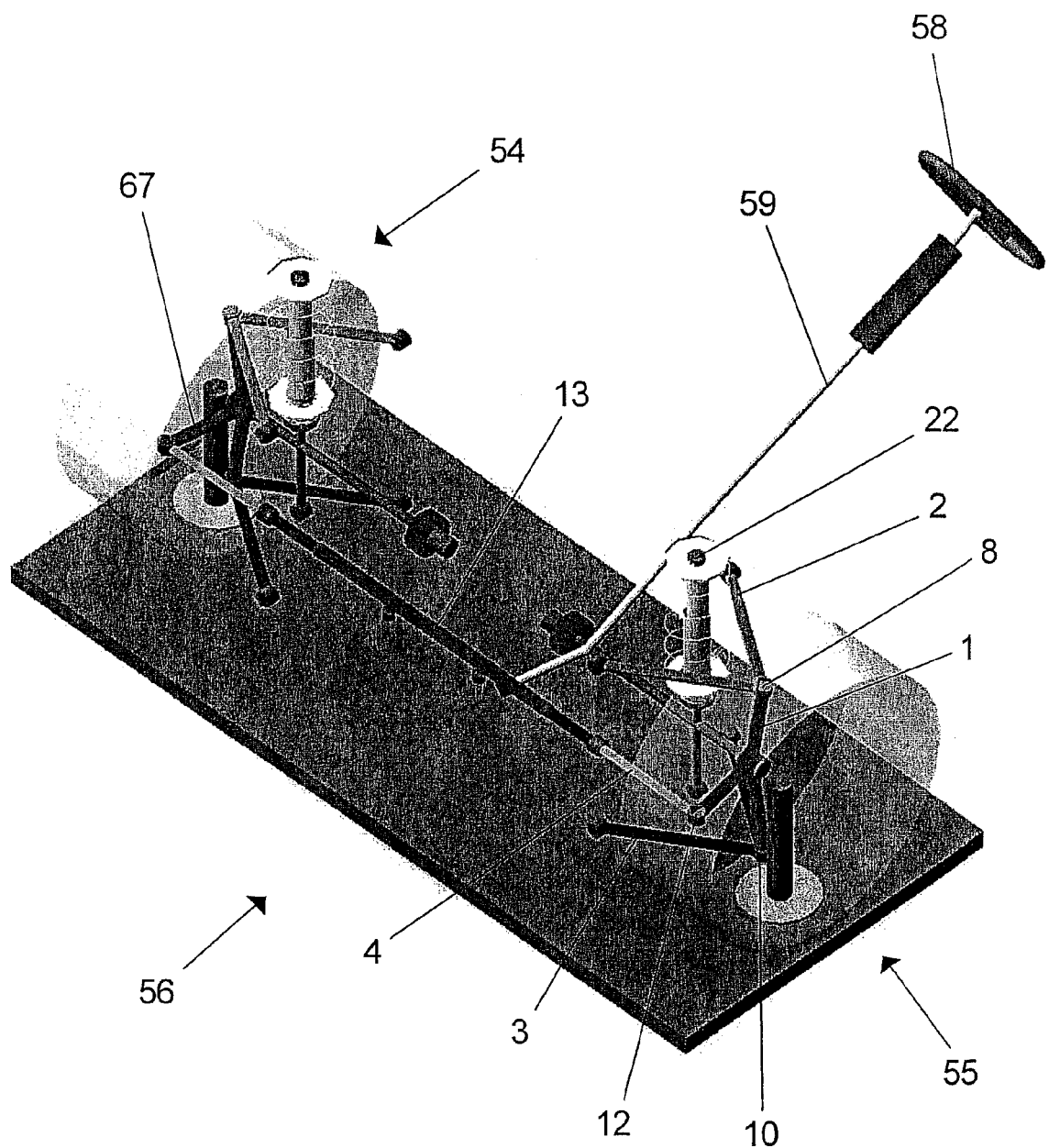
FIG. 7 is a schematic view of a steerable front axle with a wheel suspension according to the present invention according to a second embodiment.

FIG. 7 shows a schematic perspective view of an alternative steerable front axle 56, which has a wheel suspension 55 according to the present invention according to a second embodiment, where identical or similar features are designated by the same reference numbers as in the first embodiment. In the double wishbone axle shown in FIG. 7, the upper suspension arm 2 has two control arms, which are both connected to the wheel carrier 1 via the ball and socket joint 8. Furthermore, the lower suspension arm 3 has two control arms, which are both connected to the wheel carrier 1 via the ball and socket joint 10. The steering axis 30 extends through the two ball and socket joints 8 and 10 in this case.

The steering wheel 58 is connected via a steering shaft 59 to the steering gear 13, which is designed as a rack and pinion steering and acts on and is fastened to the wheel carrier 1 via the track rod 4 and the ball and socket joint 12. Furthermore, the spring type shock absorber unit 22 is shown, the free ends of the upper suspension arm 2, of the lower suspension arm 3 as well as of the spring type shock absorber unit 22 being articulated to the carrier element 5, which is not shown in this figure, or to the vehicle body 6. The wheel suspension 54 of wheel 51, which has a wheel carrier 67 for the wheel 51, is shown as well.

Figure 8:
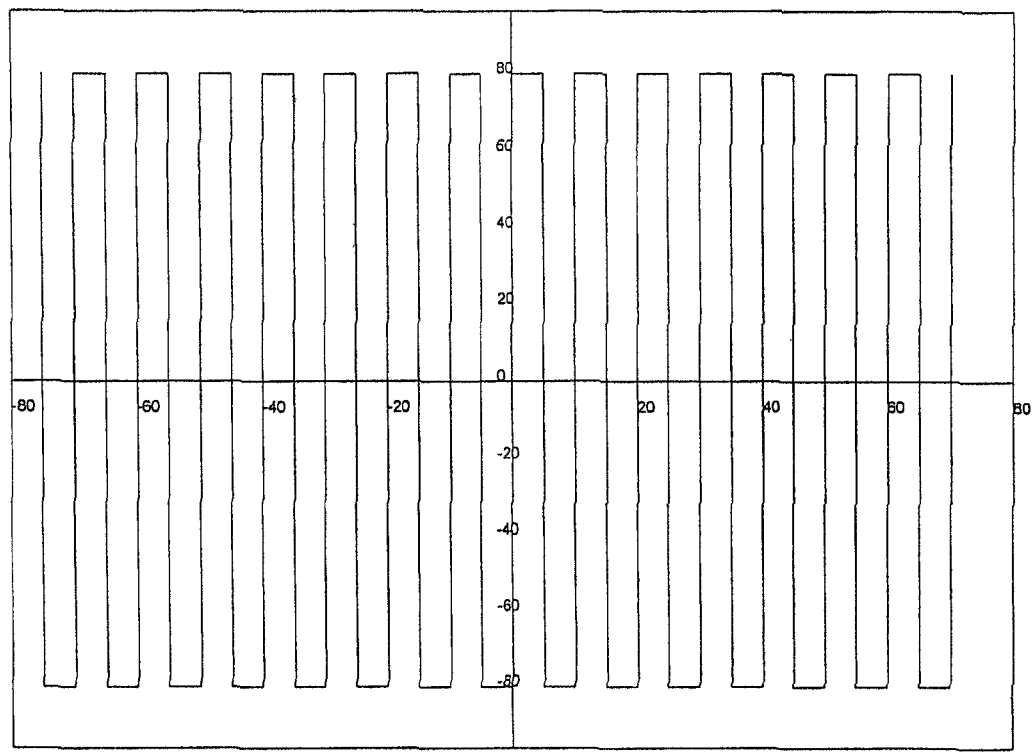
FIG. 8 is diagram of a graphic plotting of a tooth rack stroke or steering angle as a function of the spring deflection of the wheel.

The process for determining the steering angle LW, which was carried out by means of a computer simulation here, will be explained below on the basis of FIGS. 8, 9 and 10. FIG. 8 shows a system of coordinates, in which the toothed rack stroke of the steering gear 13 designed as a rack and pinion steering is plotted as a function of the spring deflection of wheel 14. The toothed rack stroke represents the steering angle LW or the angle β shown in FIG. 6 and could also be replaced by one of these angles. Furthermore, the spring deflection of the wheel characterizes, as can be seen in FIG. 2, the distance between the center 68 of the wheel 14 and the carrier element 5 or the vehicle body 6 and it is consequently the spring compression or spring compression position $z_{rel}$ of wheel 14 in relation to the vehicle body 6. The distance is preferably measured in the direction of the vertical axis of the vehicle and extends especially in parallel to direction "z" in space. The relationship between the toothed rack stroke and the spring deflection of the wheel, which is shown in FIG. 8, is difficult to follow in practice and is used here only as a preferred input variable for the computer simulation.

Figure 9:
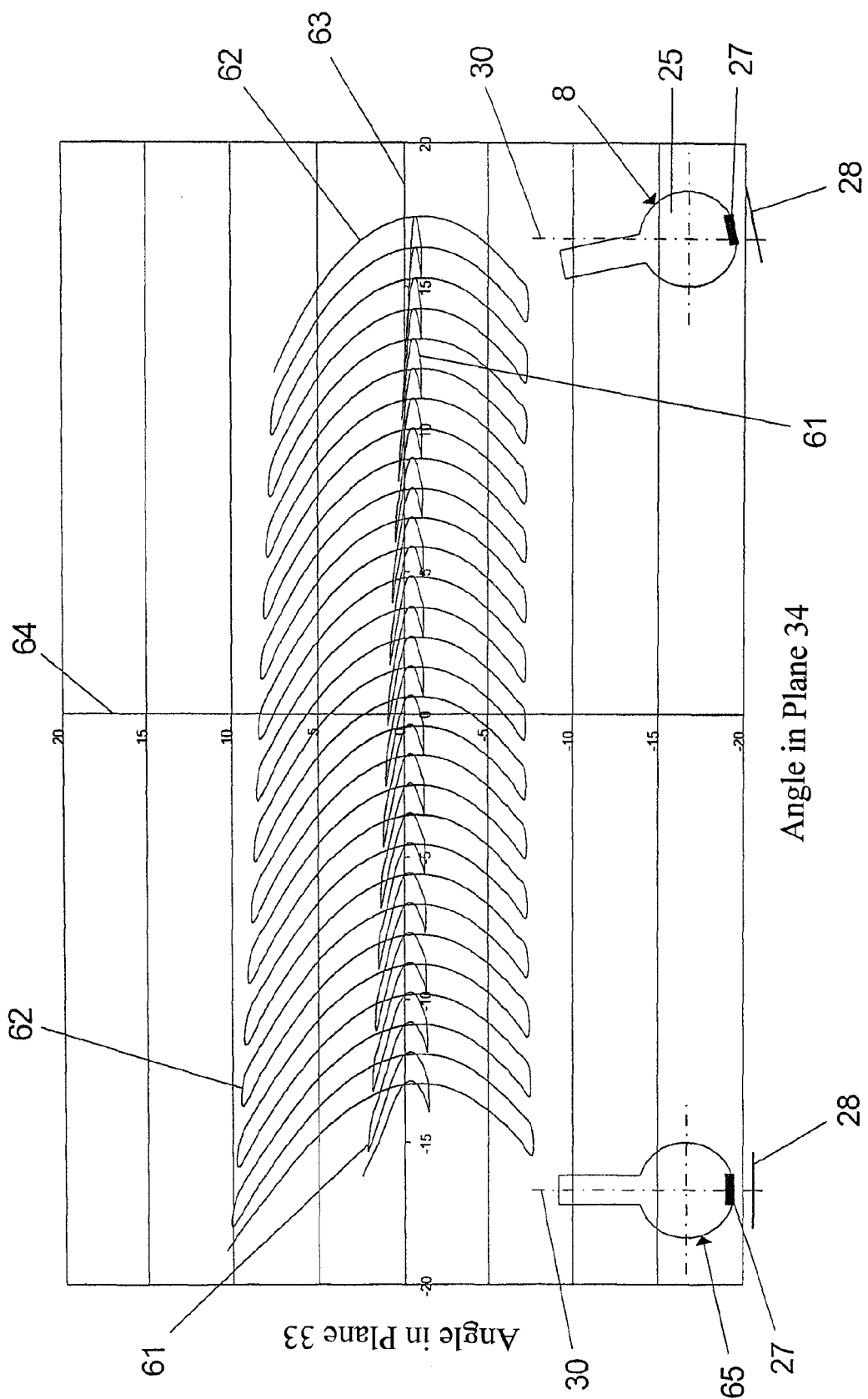
FIG. 9 is a diagram of a graphic plotting of a first of two measured angles as a function of the other angle according to an arrangement according to FIG. 2.
Figure 10:
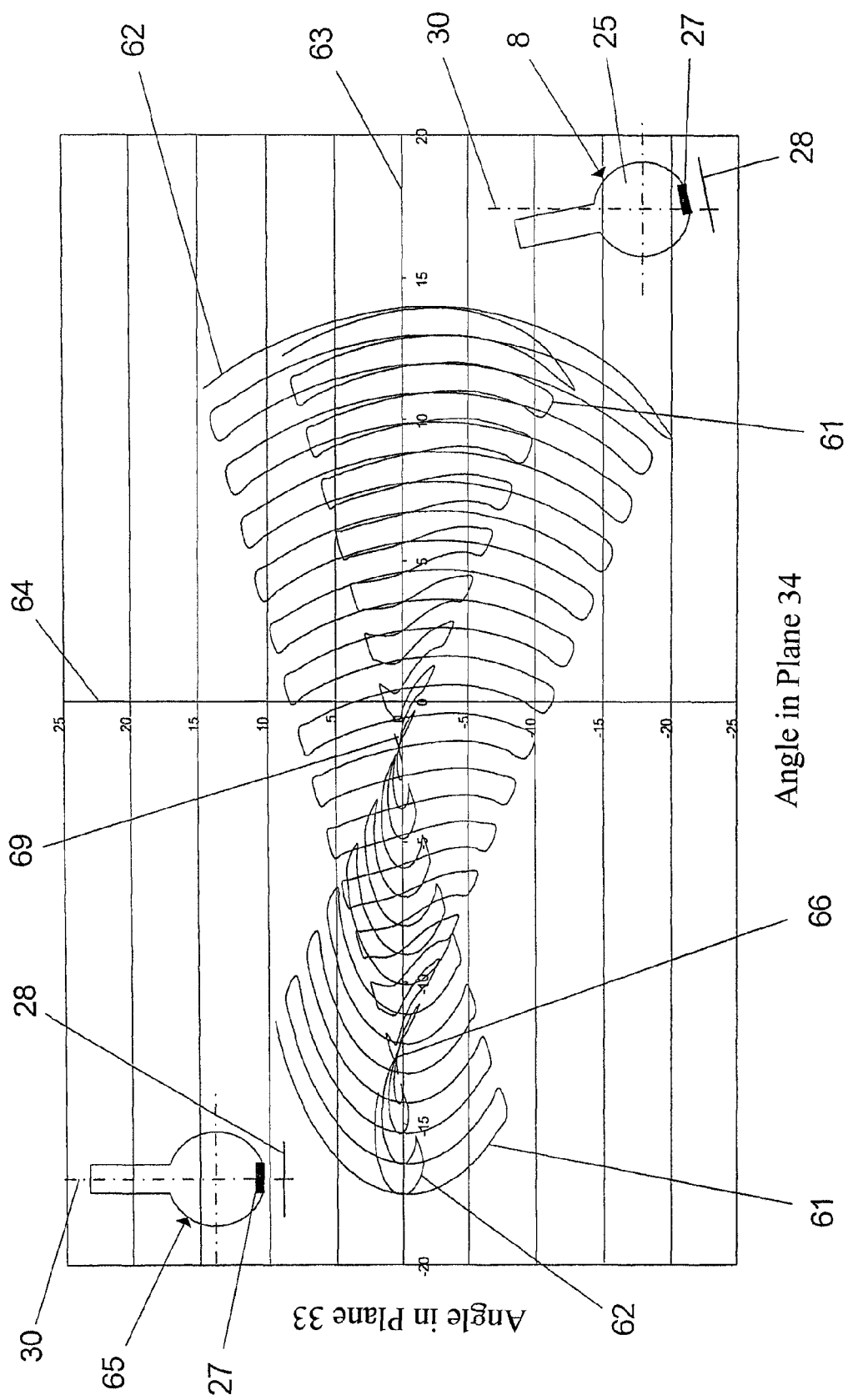
FIG. 10 is a diagram of a graphic plotting of a first of two measured angles as a function of the other angle according to an arrangement according to FIG. 3.

FIGS. 9 and 10 show the results of this computer simulation; each of these figures shows a system of coordinates, in which the two angles detected by the angle-measuring device or the sensor assembly unit 28 are plotted as a function of each other. Reference number 63 designates the abscissa in both systems of coordinates, whereas reference number 64 designates the ordinate. Two curves 61 and 62 are shown in each system of coordinates, a first of the curves 61 describing a "straight arrangement" (α=0°) of the ball and socket joint 8 at the wheel carrier 1 and the second curve 62 representing the "oblique arrangement" according to the present invention (0°<α<90°) of the ball and socket joint 8 at the wheel carrier 1. The ball and socket joint 65 shown schematically indicates the straight installation position and is assigned to curve 61, whereas the ball and socket joint 8 according to the present invention, which is shown schematically, is fastened obliquely to the wheel carrier 1 and is assigned to curve 62.

According to FIG. 9, the ball pivot 25 is fixed to the wheel carrier 1, whereas the ball and socket joint housing 26 is fastened, together with the sensor assembly unit 28, to the upper suspension arm 2. It can be clearly recognized that the value of the angle in plane 33 decreases with increasing angle in plane 34, so that the sensor assembly unit 28 can no longer unambiguously resolve the exact shape of the curve 61. By contrast, markedly higher values are obtained for the angle in plane 33 due to the oblique position of the ball and socket joint 8 according to the present invention, and the contour of curve 62 can be resolved to a sufficient extent by the sensor assembly unit 28. This possibility of resolving the contour of curve 62 can be maintained, as a function of the angle α, in the entire practically relevant range of the steering angles LW, the angle α being formed between the direction of magnetization M and the steering axis 30.

According to FIG. 10, the ball and socket joint housing 26 is fastened to the wheel carrier 1 together with the sensor assembly unit 28, whereas the ball pivot 25 is fixed to the upper suspension arm 2. A range, which cannot be resolved for the sensor assembly unit 28 any longer and which is designated by reference number 66, is obtained for curve 62, which was recorded with the arrangement of the ball and socket joint according to the present invention in this reversed arrangement of the ball and socket joint 8. However, by suitably selecting the oblique position angle α and/or γ, this range 66 can be shifted along the abscissa 63 in the direction of decreasing abscissa values until it ceases to have a negative effect on the steering angle determination for steering angles LW occurring in practice. Since the magnet 27 is pivotable in this case together with the ball pivot 25 relative to the wheel carrier 1 and hence also relative to the steering axis 30, it shall be ensured when installing the ball and socket joint 8 that the angle α between the direction of magnetization M and the steering axis 30 is always greater than 0° and especially greater than 5°. This preset angle value shall preferably be complied with for all possible operating states of the motor vehicle. By contrast, curve 61 determined with a straight arrangement of the ball and socket joint 65, has a non-resolvable range 69, which is located in the vicinity of the ordinate 64 and thus stands in the way of the unambiguous determination of the steering angle LW in the relevant steering angle range.

Since a range for relevant steering angles LW corresponding to the range 66 does not appear in the curve 62 shown in FIG. 9, the oblique arrangement of the ball pivot 25 at the wheel carrier 1 is preferred to the oblique arrangement of the housing 26 at the wheel carrier 1. However, both alternatives yield sufficient results, so that this statement shall not be construed as being limiting.

FIGS. 11 through 14 additionally show diagrams which show the angles determined by means of the angle-measuring device in case of different arrangements and orientations of the joint, the angle in plane 34 being plotted along the abscissa 63 and the angle in plane 33 being plotted along the ordinate 64. Curve 60 represents an installation position, in which the joint housing is fixed at the suspension arm and the pivot pin at the wheel carrier, whereas curve 70 represents an installation position in which the joint housing is fastened to the wheel carrier and the pivot pin to the suspension arm.

Figure 11:
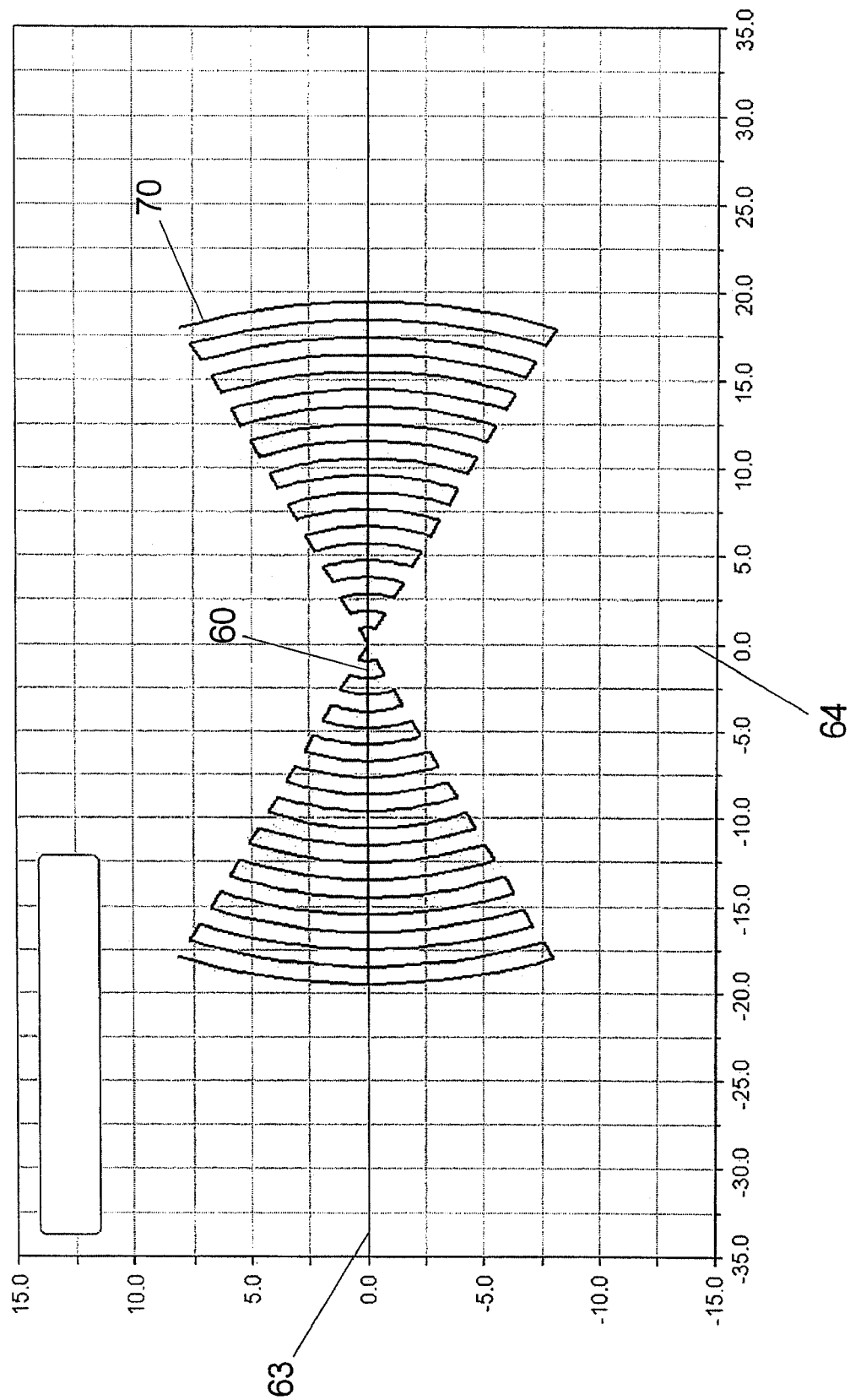
FIG. 11 is a diagram of a graphic plotting of angles determined by the angle-measuring device in one arrangement and orientation of the joint.

In FIG. 11, curve 60 represents a measurement, where the longitudinal axis of the pivot pin fastened to the wheel carrier is the same as the steering axle or is oriented in parallel to the steering axle. Curve 60 lies on the abscissa 63. Curve 70 represents, furthermore, a measurement, in which the longitudinal axis of the joint housing fastened to the wheel carrier is the same as the steering axle or is oriented in parallel to the steering axle. In particular, the direction of magnetization is parallel to the longitudinal axis of the pivot pin or coincides with that longitudinal axis in both cases.

Figure 12:
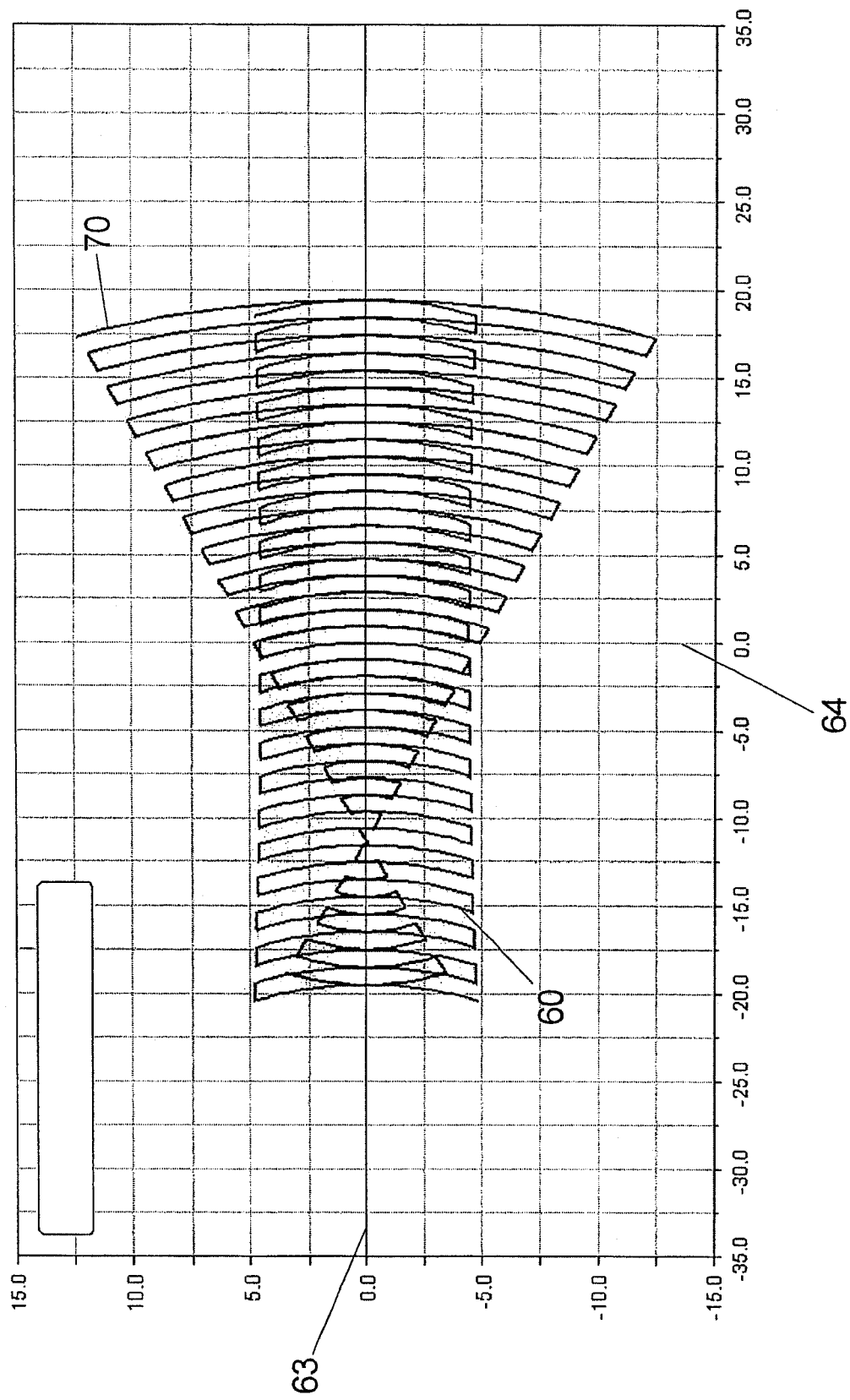
FIG. 12 is a diagram of a graphic plotting of angles determined by the angle-measuring device in another arrangement and orientation of the joint.

In FIG. 12, curve 60 represents a measurement, where the longitudinal axis of the pivot pin fastened to the wheel carrier is oriented obliquely to the steering axle. Furthermore, curve 70 represents a measurement, where the longitudinal axis of the joint housing fastened to the wheel carrier is oriented obliquely to the steering axle. The oblique position angle preferably has the same value in both cases. In particular, the direction of magnetization is also parallel to the longitudinal axis of the pivot pin or coincides with same in both cases.

Figure 13:
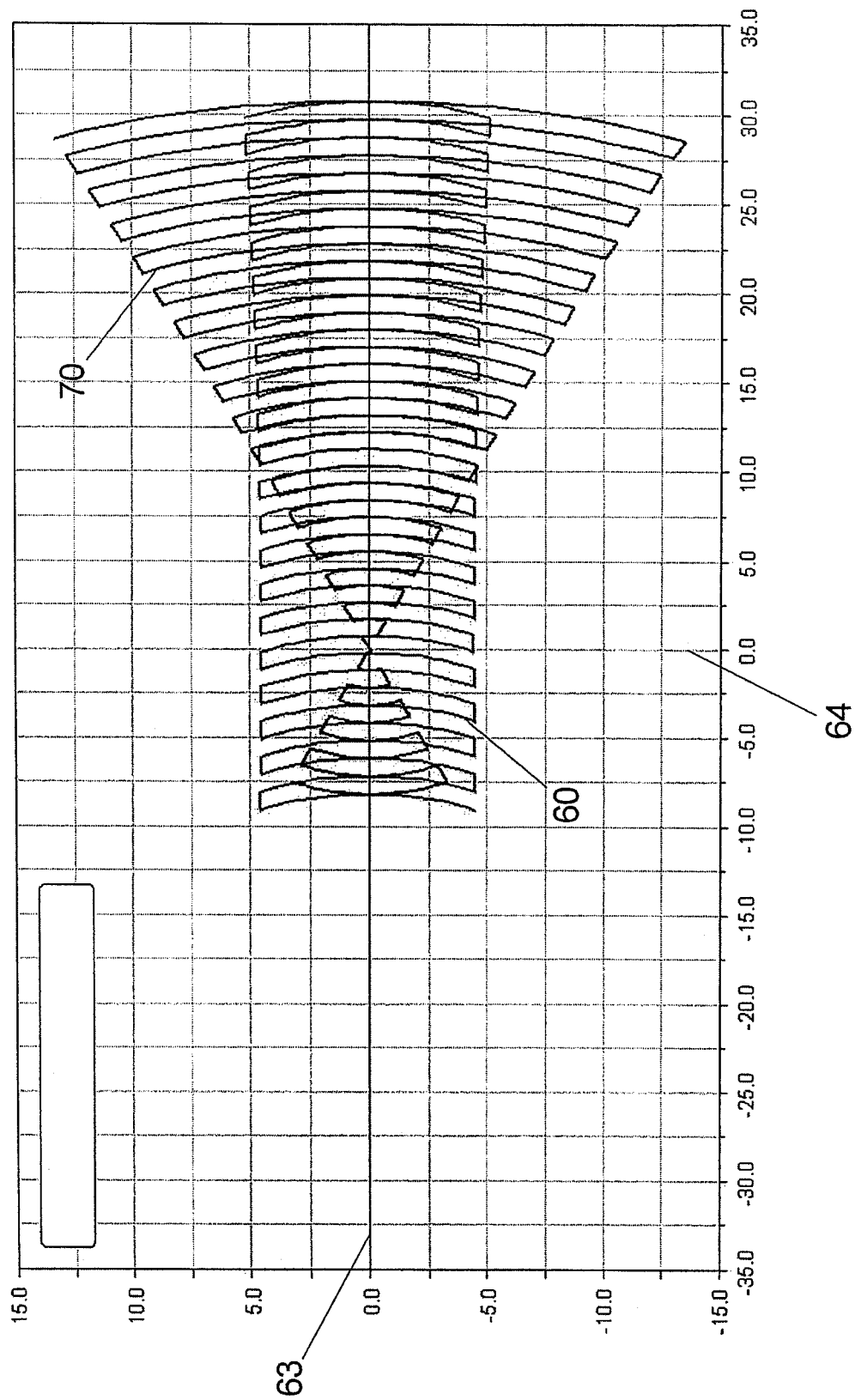
FIG. 13 is a diagram of a graphic plotting of angles determined by the angle-measuring device in a different arrangement and orientation of the joint.

FIG. 13 shows curve 60 of a measurement in which the longitudinal axis of the pivot pin fastened to the wheel carrier is directed obliquely in relation to the steering axle. Furthermore, curve 70 represents a measurement in which the longitudinal axis of the joint housing fastened to the wheel carrier is the same as the steering axle or is oriented in parallel to the steering axle. In particular, the direction of magnetization is parallel to the longitudinal axis of the pivot pin or coincides with same in both cases.

Figure 14:
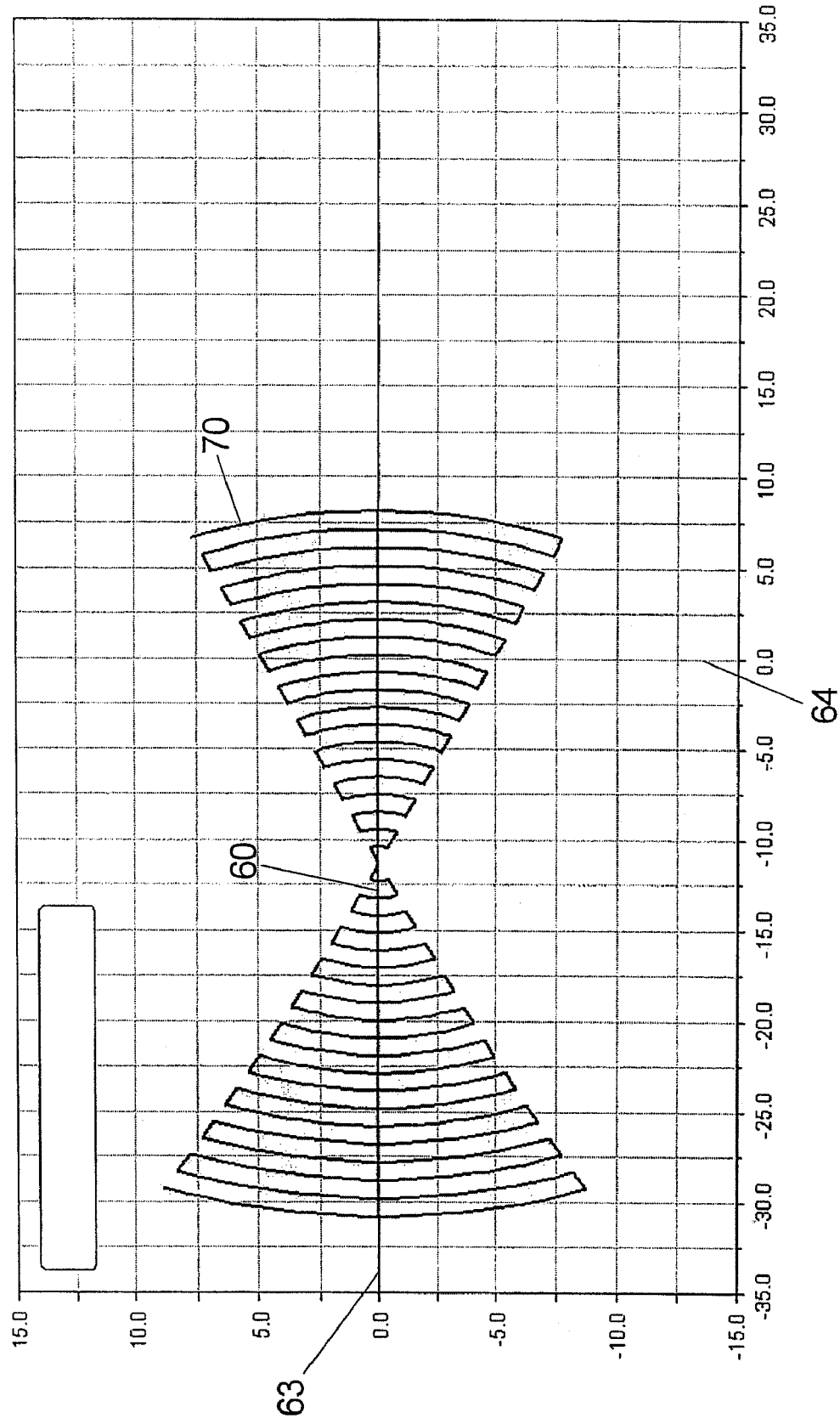
FIG. 14 is a diagram of a graphic plotting of the angles determined by the angle-measuring device in another different arrangements and orientation of the joint.

In FIG. 14, curve 60 represents a measurement in which the longitudinal axis of the pivot pin fastened to the wheel carrier is the same as the steering axle or is oriented in parallel to the steering axle. Curve 60 lies on the abscissa 63. Furthermore, curve 70 represents a measurement in which the longitudinal axis of the joint housing fastened to the wheel carrier is oriented obliquely to the steering axle. In particular, the direction of magnetization is parallel to the longitudinal axis of the pivot pin or coincides with same in both cases.

While specific embodiments of the invention have been shown and described in detail to illustrate the application of the principles of the invention, it will be understood that the invention may be embodied otherwise without departing from such principles.

The invention claimed is:

1. A wheel suspension for a vehicle, the wheel suspension comprising:
    a carrier element;
    a wheel carrier arranged at a spaced location from said carrier element, said wheel carrier being pivotable about a steering axis;
    a wheel mounted rotatably on said wheel carrier;
    a steering wheel connected rotatably to said carrier element such that said wheel carrier pivots about said steering axis when said steering wheel is turned;
    a joint connected to said wheel carrier, said joint having a housing, a pivot pin mounted pivotably in said housing and an angle-measuring device having a magnet and a magnetic field-sensitive sensor assembly unit, said magnet having a magnetization oriented such that said magnetization extends obliquely to said steering axis, said angle-measuring device detecting a deflection of said pivot pin in relation to said housing in at least two different directions; and
    a guide means for connecting said joint to said carrier element.

2. A wheel suspension in accordance with claim 1, wherein an angle between the magnetization and said steering axis is greater than or equal to 5° and less than or equal to 15°.

3. A wheel suspension in accordance with claim 1, wherein said joint is a ball and socket joint and said pivot pin is a ball pivot.

4. A wheel suspension in accordance with claim 1, wherein said joint having a defined joint longitudinal axis, said joint being fastened to said wheel carrier such that said joint with said joint longitudinal axis extends obliquely to said steering axis.

5. A wheel suspension in accordance with claim 1, wherein said pivot pin is fastened to said wheel carrier and said housing is fastened to said guide means.

6. A wheel suspension in accordance with claim 5, wherein said pivot pin has a defined pivot pin longitudinal axis, said pivot being arranged such that said pivot pin longitudinal axis extends obliquely to said steering axis.

7. A wheel suspension in accordance with claim 6, wherein the magnetization of said magnet extends parallel to said pivot pin longitudinal axis of said pivot pin or coincides with said pivot pin longitudinal axis.

8. A wheel suspension in accordance with claim 1, further comprising a steering gear and a track rod, said steering wheel actuating said steering gear, said steering gear being connected to said wheel carrier via said track rod such that said steering gear is connected to said carrier element.

9. A wheel suspension in accordance with claim 8, wherein said steering wheel is mechanically connected to said steering gear via a steering shaft.

10. A wheel suspension in accordance with claim 1, wherein said guide means is a suspension arm.

11. A wheel suspension in accordance with claim 1, wherein said wheel carrier is connected to said carrier element via a spring.

12. A wheel suspension in accordance with claim 1, wherein said magnet is arranged in said pivot pin and said sensor assembly unit is arranged in said housing.

13. A wheel suspension in accordance with claim 1, wherein said sensor assembly unit has two sensors oriented at right angles to one another.

14. A wheel suspension in accordance with claim 1, wherein said sensor assembly unit has two sensors, each sensor having a sensitive sensing surface, each sensitive surface being located in a plane, one plane of one sensitive surface intersecting with another plane of another sensitive surface along an intersection line, said intersection line coinciding with said longitudinal axis of said housing or said intersection line extending in parallel to said longitudinal axis of said housing.

15. A wheel suspension in accordance with claim 1, wherein said sensor assembly unit has two sensors, each sensor having a sensitive sensing surface, each sensitive surface being located in a plane, one plane of one sensitive surface intersecting with another plane of another sensitive surface along an intersection line, wherein said housing has a defined housing longitudinal axis and said pivot pin has a defined pivot pin longitudinal axis, said angle-measuring device determining two angles located between said pivot pin longitudinal axis and said housing longitudinal axis, said two angles being located in said one plane and said another plane.

16. A wheel suspension in accordance with claim 15, wherein said one plane is oriented at a right angle to said another plane.

17. A wheel suspension in accordance with claim 15, wherein said intersection line coincides with said housing longitudinal axis of said housing or extends in parallel to said housing longitudinal axis.

18. A wheel suspension in accordance with claim 1, further comprising a vehicle body, said carrier element being connected to said vehicle body, said wheel suspension being connected to said vehicle body via said carrier element.

19. A wheel suspension in accordance with claim 18, wherein at least one second wheel carrier with a second wheel arranged rotatably thereon is arranged at a spaced location from said vehicle body and is connected to said vehicle body, said two wheels being part of a vehicle steering arrangement.

20. A wheel suspension for a vehicle, the wheel suspension comprising:
  a carrier element;
  a wheel carrier arranged at a spaced location from said carrier element, said wheel carrier being pivotable about a steering axis;
  a wheel mounted rotatably on said wheel carrier;
  a steering wheel connected rotatably to said carrier element such that said wheel carrier pivots about said steering axis when said steering wheel is turned;
  a joint connected to said wheel carrier, said joint having a housing, a pivot pin mounted pivotably in said housing and an angle-measuring device including a magnet and a magnetic field-sensitive sensor assembly unit, said magnet having a magnetization oriented such that said magnetization extends obliquely to said steering axis, said magnetic field-sensitive sensor assembly unit having a first sensor and a second sensor, said first sensor detecting a first deflection of said pivot pin relation to said joint housing in a first direction, said second sensor detecting a second deflection of said pivot pin in relation to said joint housing in a second direction, said first direction being different than said second direction; and
  a guide means for connecting said joint to said carrier element.

* * * * *